INVENTOR.
William F. Weber
BY Carl C. Batz
ATTORNEY

3,049,986
DIPPING MACHINE
William F. Weber, 6541 S. Troy St., Chicago 29, Ill.
Filed Jan. 19, 1959, Ser. No. 787,471
2 Claims. (Cl. 99—234)

This invention relates to a machine for dipping pieces of meat or the like in liquids such as a tenderizing solution.

It is an object of the invention to provide a machine which will receive a piece of meat or the like, pass the meat through a liquid and again bring the piece out of the liquid. A further object is to provide such a machine which will keep the piece of meat or the like immersed in the liquid for a predetermined length of time before removing it from the liquid. Another object is to provide such a machine which will turn the meat piece as it is being immersed and as it is being drained, and which will deliver the drained piece to a point where it may easily be removed from the machine. Still another object is to provide such a machine which will automatically discharge the dipped piece from the solution and from the machine without requiring the attention of an operator.

The invention is illustrated in the accompanying drawing wherein

Figure 1:
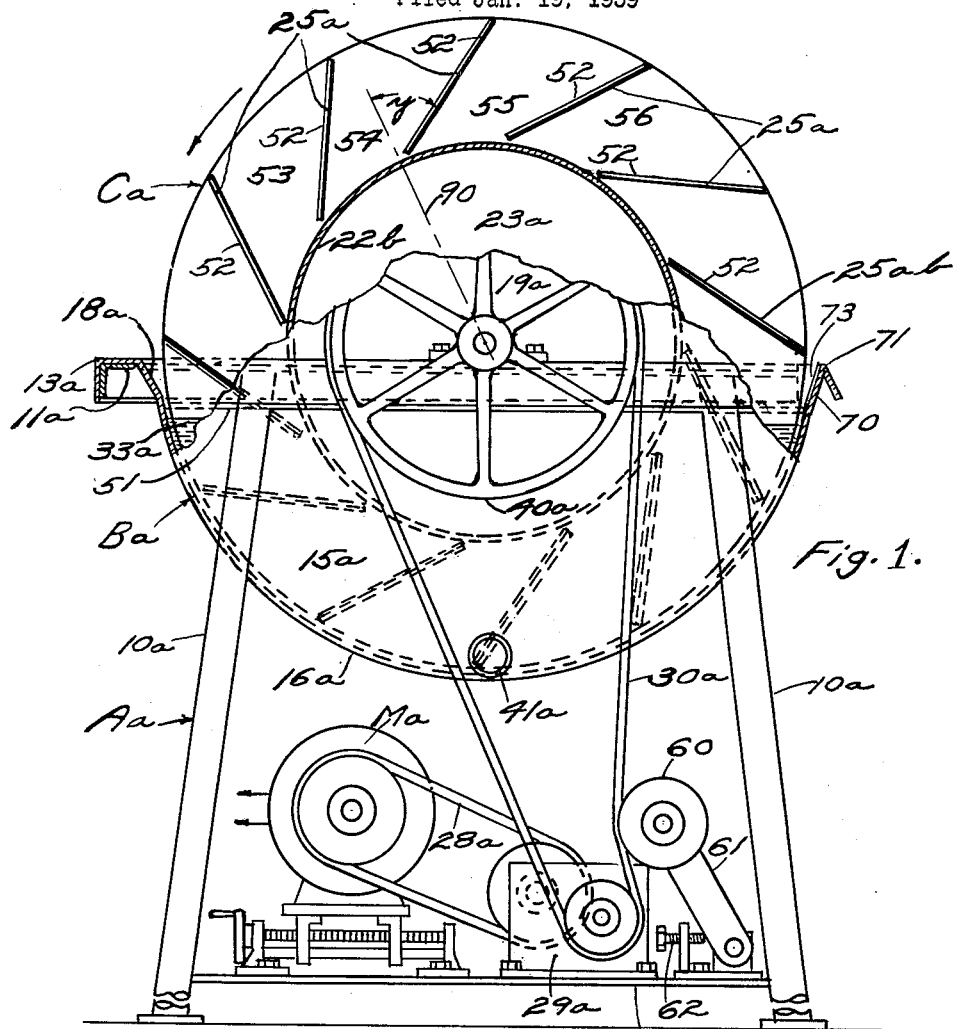
Figure 2:
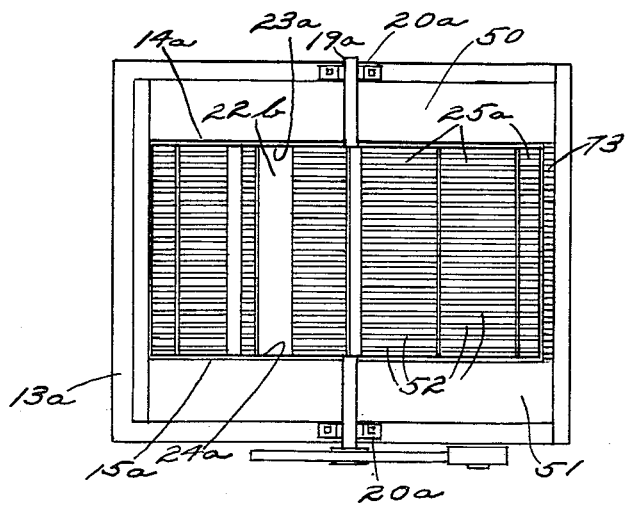

FIGURE 1 is a side view partly in cross section of an embodiment of the machine; and FIGURE 2 is a top or plan view of the embodiment illustrated in FIGURE 1.

Referring to FIGURES 1 and 2, the frame $Aa$ supports the pan $Ba$ which contains the liquid or solution to be used, and the wheel $Ca$ serves upon rotation to receive the pieces therein and to move them from one end of the pan to the other.

The frame $Aa$ includes four standards $10a$ which at their top ends are secured to the rectangular top piece $11a$ of the frame $Aa$. A rectangular shaft $12a$ is secured at its four corners with the standards $10a$ near the lower ends of the standards.

The pan $Ba$ has its edges $13a$ hooked over the top frame piece $11a$ and is thus supported in the frame. This pan has vertical sides $14a$ and $15a$ which are parallel with each other and which extend downwardly and join with the bottom piece $16a$ to make a container for the liquid. Thus, the container is generally in the form of the lower part of a cylinder. At the top portion of the pan are the laterally extending overflow enclosures $50$ and $51$. These supplementary enclosures have their bottom areas at a level about even with the intended top of the liquid to be contained within the pan, and have sides and ends so that when liquid overflows from the pan out into these areas, the liquid will be contained and not overflow from the machine.

Near its front the bottom piece $16a$ breaks away from the normal cylindrical shape of the bottom piece to form a downwardly inclined lip $18a$ which makes an acute angle with the wheel. A drain $41a$ is provided for removing the liquid when desired.

Also near the rear end of the machine the bottom $16a$ moves away from the cylindrical form as shown at $70$ to form a lip portion culminating at the point $71$. On the inside of this lip are the corrugations $73$ which have a function in draining liquid back into the pan when the liquid tends to be pushed up and out along with the meat piece.

The wheel $Ca$ is mounted for rotation about a horizontal axis and has its shaft $19a$ journaled in bearings $21a$ secured on top of the frame piece $11a$. The left side plate $23a$ and the right side plate $24a$ are in the form of circular disks having their centers secured to the shaft $19a$. Extending between these side plates is the cylinder $22b$ which may be formed of sheet metal. The axis of the cylinder $22b$ corresponds with the axis of shaft $19a$. The end edges of the cylinder are secured as by welding to the side plates.

Extending at uniformly spaced intervals from the surface of cylinder $22b$ to the outer peripheral edge of the wheel are the paddle elements $25a$. These paddle elements $25a$ are not positioned radially with respect to the cylinder $22b$ and shaft $19a$, but are placed at an angle with the theoretical radius. Referring to FIGURE 3, the line $90$ represents such a radius, and the paddle elements make an angle $y$ with this radius. The angle $y$ may be any acute angle and preferably is about $60°$. In other words the inner edges of the paddle elements are placed ahead of the outer edges in the direction of rotation of the wheel. When the paddle elements emerge from the liquid at the rear of the machine (see the position of paddle $25ab$) they present an inclined surface so that meat pieces emerging on this paddle element will slide rearward from the machine.

Also the paddle elements $25a$ may have corrugations $52$ which present ridges and channels at the surfaces of the paddles and serve a function in the draining of the liquid in the operation of the machine. These corrugations also serve a very important function by permitting the meat to slide easier from the paddles at the outlet end of the machine.

The paddle elements $25a$, along with the cylinder $22b$ at the back and disks $23a$ and $24a$ at the sides, form a series of pockets $53$, $54$, $55$, etc. capable of receiving pieces of meat or the like to be dipped. Although the disks $23a$ and $24a$ are shown as solid or imperforate, these elements may be perforate or open or mere structures for supporting and holding the paddle elements in position.

The wheel $Ca$ extends down into the pan $Ba$ so that the outer periphery of the wheel is just adjacent the bottom $16a$ of the pan, with the bottom $16a$ so curved as to conform with the lower portion of the wheel.

The wheel $Ca$ is driven by an electric motor $Ma$ which is mounted on shelf $12a$ and which, through belt $28a$, drives the reducing gear enclosed within box $29a$, also mounted on shelf $12a$. Connected with the gears of box $29a$ is the V-belt $30a$ which drives the pulley $40a$ secured to shaft $19a$. Suitably the drive ratio may be such as to drive the wheel $Ca$ at speeds of one revolution every one to three minutes.

Another feature of this form of the invention is the provision of the idler pulley $60$ mounted on the pivoted arm $61$ and resting by force of gravity against the belt $30a$. A set screw $62$ serves to limit the forward movement of the arm and so limit the pressure which the pulley exerts against the belt. If desired, the arm $61$ may be provided with a spring which will positively cause it to press against the belt. By adjusting the screw $62$ it is possible to provide enough tension in the belt to drive the machine but not enough to prevent the slippage of the belt in the event of an accident which would tend to block the movement of the wheel. This is important as a safety feature. Also, this arrangement enables the loosening of the belt $30a$ merely by raising the arm $61$. This enables removal of the belt from the pulleys which allows removal of the wheel $Ca$ upwardly of the frame.

In the operation of the embodiment illustrated in FIGURES 1 and 2 to dip meat pieces into tenderizing solution, for example, the pan $Ba$ is first filled with the solution $33a$ to a level which is approximately the same as the overflow pans $50$ and $51$. An operator may stand at the front end of the machine and place a piece of meat in one of the pockets $53$, $54$ and $55$. As is clearly shown in FIGURE 3, the paddle on which the meat will rest slants downwardly from the mouth of the pocket at the loading end of the machine, and this tends to hold the piece and prevent any tendency of the meat to get out of the pocket before descending into the pan where it is contained by the bottom 16a.

As the wheel revolves further the meat piece is passed slowly through the liquid, finally reaching the rear of the machine. As the piece is pushed up onto the portion 70 of the bottom wall, the piece begins to move out. The paddle element supporting it at that point holds it on an inclined plane, and when the piece reaches the outlet edge 71 it immediately slides off the paddle element and out of the machine where it may be caught by a container or conveyor belt. As the piece is moving out of the liquid, drainage may occur beneath the meat piece through the channels formed by the corrugations 52 on the paddle elements, and also in the channels formed by the corrugations 73 on the outlet lip of the bottom element 16a. The meat pieces leaving the machine have been efficiently treated and are passed on for further handling and packaging.

It is thus a principal feature of the embodiment of FIGURES 1 and 2 that the machine automatically ejects the pieces after they have been dipped and does this without any manual attention whatsoever.

Another feature to be noted is that when, through the effect of agitation which comes as a result of the rotation of the wheel Ca and the movement of meat pieces, or because of volume of meat has been immersed in the liquid, the liquid tends to overflow the pan at any point, the overflow liquid will simply move out into the overflow pans 50 and 51 without raising the overall level of the liquid to any substantial extent, and be contained without loss or damage. Then, when the volume of meat has been removed, the liquid will again flow back from the overflow areas into the main portion of the pan without substantially lowering the overall level of the liquid.

It is understood that many other embodiments of the invention may be made in accordance with the principles herein set forth and the skill of the art, and all such embodiments are considered within the scope of the invention.

The present application is a continuation in part of my copending application, Serial Number 709,280, filed January 16, 1958, entitled "Dipping Machine," now abandoned.

I claim:

1. A machine for dipping pieces of meat or the like in liquid comprising a frame, a wheel mounted in said frame and rotatable about a horizontal axis, paddle elements extending outwardly to the periphery of the wheel, a pan mounted in said frame and adapted to contain liquid, said wheel having its lower part extending into said pan, the bottom of said pan conforming to and adjacent the periphery of the lower portion of said wheel, said paddle elements being adapted to receive between them the pieces to be dipped and upon rotation of said wheel to move said pieces from one end of the pan through said liquid to the other end of the pan, said paddle elements having on their forward sides corrugated metal with the corrugations running radially of the wheel whereby the dipped pieces being raised from the liquid by the paddle elements are permitted to drain and slide easily from the wheel, and means for driving said wheel at a constant speed of rotation.

2. In a machine for dipping pieces of meat or the like, a pan having a cylindrically shaped bottom, a wheel adapted to rotate about a horizontal axis with its lower portion in said pan and its periphery adjacent the bottom of said pan, said wheel having spaced paddle elements extending outwardly to the periphery of said wheel and adapted upon rotation of the wheel to push the pieces being treated from the front of the pan through said liquid to the rear of the pan, said paddle elements being inclined with respect to the radii of said wheel so that when they reach the rear of the pan they slope downwardly toward their outer edges thus to cause the pieces being treated to slide therefrom, said paddle elements having on their forward sides corrugated metal with the corrugations running radially of the wheel whereby the dipped pieces being raised from the liquid by the paddle elements are permitted to drain and slide easily from the wheel.

References Cited in the file of this patent

UNITED STATES PATENTS

| | | |
|---|---|---|
| 628,866 | Starrett | July 11, 1899 |
| 721,233 | Prince | Feb. 24, 1903 |
| 790,580 | Kurtz | May 23, 1905 |
| 1,176,866 | Smith | Mar. 28, 1916 |
| 1,185,329 | Janisch | May 30, 1916 |
| 2,618,284 | Purnell | Nov. 18, 1952 |
| 2,795,254 | Hill | June 11, 1957 |